(12) United States Patent
Leach

(10) Patent No.: US 7,487,282 B2
(45) Date of Patent: *Feb. 3, 2009

(54) HOST-CLIENT UTILITY METER SYSTEMS AND METHODS FOR COMMUNICATING WITH THE SAME

(76) Inventor: Mark A. Leach, 177 McClain Cir., Macon, GA (US) 31216

( * ) Notice: Subject to any disclaimer, the term of this patent is extended or adjusted under 35 U.S.C. 154(b) by 0 days.

This patent is subject to a terminal disclaimer.

(21) Appl. No.: 11/671,578

(22) Filed: Feb. 6, 2007

(65) Prior Publication Data
US 2007/0130408 A1 Jun. 7, 2007

Related U.S. Application Data

(63) Continuation of application No. 10/991,789, filed on Nov. 18, 2004, now Pat. No. 7,185,131, which is a continuation-in-part of application No. 09/591,258, filed on Jun. 9, 2000, now Pat. No. 6,954,814.

(60) Provisional application No. 60/520,900, filed on Nov. 18, 2003.

(51) Int. Cl.
G06F 13/14 (2006.01)
G06F 11/00 (2006.01)
H04M 11/00 (2006.01)
(52) U.S. Cl. .................. 710/305; 714/48; 379/106.03
(58) Field of Classification Search ................ 710/305, 710/315; 358/1.15; 370/313; 714/48, 57; 379/106.03
See application file for complete search history.

(56) References Cited

U.S. PATENT DOCUMENTS

| 5,031,209 A | 7/1991 | Thornborough et al. |
|---|---|---|
| 5,111,407 A | 5/1992 | Galpern |
| 5,179,660 A | 1/1993 | Devany et al. |
| 5,264,958 A * | 11/1993 | Johnson ............ 710/315 |
| 5,451,937 A | 9/1995 | Olson et al. |
| 5,473,322 A | 12/1995 | Carney |
| 5,541,589 A | 7/1996 | Delaney |
| 5,590,179 A | 12/1996 | Shincovich et al. |
| 5,852,658 A | 12/1998 | Knight et al. |

(Continued)

FOREIGN PATENT DOCUMENTS

JP 2003256969 9/2003

OTHER PUBLICATIONS

The International Search Report for PCT/US2004/038672 mailed Aug. 23, 2005.

(Continued)

*Primary Examiner*—Glenn A Auve
*Assistant Examiner*—Trisha Vu

(57) ABSTRACT

A host automated meter reading (AMR) device may communicate with one or more client AMR devices in proximity to the host meter. The host and client AMR devices operate as master and slave devices, respectively, in a host-client AMR device system. The host AMR device may transmit command and control functions to the client AMR devices, and may receive AMR device information from each client AMR device. The host AMR device may also transmit AMR device information from both itself and the client AMR devices over a communications network to a utility. Furthermore, the host AMR device may receive command and control functions from the utility via the same communications network, and may relay those functions to the AMR devices associated with that particular host AMR device.

24 Claims, 4 Drawing Sheets

U.S. PATENT DOCUMENTS

| | | | |
|---|---|---|---|
| 5,875,234 | A | 2/1999 | Clayton et al. |
| 5,897,607 | A | 4/1999 | Jenney et al. |
| 5,898,387 | A | 4/1999 | Davis et al. |
| 5,914,941 | A * | 6/1999 | Janky .................... 370/313 |
| 5,923,269 | A | 7/1999 | Shuey et al. |
| 5,940,009 | A | 8/1999 | Loy et al. |
| 5,986,574 | A | 11/1999 | Colton |
| 5,994,892 | A | 11/1999 | Turino et al. |
| 6,016,432 | A | 1/2000 | Stein |
| 6,118,269 | A | 9/2000 | Davis |
| 6,124,806 | A | 9/2000 | Cunningham et al. |
| 6,199,133 | B1 | 3/2001 | Schnell |
| 6,212,550 | B1 | 4/2001 | Segur |
| 6,215,405 | B1 | 4/2001 | Handley et al. |
| 6,219,409 | B1 | 4/2001 | Smith et al. |
| 6,240,107 | B1 | 5/2001 | Glass et al. |
| 6,290,646 | B1 | 9/2001 | Cosentino et al. |
| 6,304,231 | B1 | 10/2001 | Reed et al. |
| 6,360,177 | B1 | 3/2002 | Curt et al. |
| 6,509,841 | B1 | 1/2003 | Colton et al. |
| 6,601,124 | B1 | 7/2003 | Blair |
| 6,671,636 | B2 | 12/2003 | Dawson |
| 6,784,806 | B1 | 8/2004 | Lee et al. |
| 6,801,331 | B1 * | 10/2004 | Motoyama ................ 358/1.15 |
| 6,891,838 | B1 | 5/2005 | Petite et al. |
| 6,954,814 | B1 | 10/2005 | Leach |
| 7,043,532 | B1 | 5/2006 | Humpleman et al. |
| 7,185,131 | B2 * | 2/2007 | Leach ....................... 710/305 |
| 2002/0180615 | A1 | 12/2002 | Kim et al. |
| 2004/0024483 | A1 | 2/2004 | Holcombe |
| 2004/0113810 | A1 | 6/2004 | Mason et al. |
| 2005/0035877 | A1 | 2/2005 | Kim |

OTHER PUBLICATIONS

The Written Opinion for PCT/US2004/038672 issued on May 18, 2006.

* cited by examiner

HOST-CLIENT UTILITY METER SYSTEMS AND METHODS FOR COMMUNICATING WITH THE SAME

RELATED APPLICATION DATA

The present application is a continuation of, and claims the benefit of priority to, U.S. patent Ser. No. 10/991,789, filed on Nov. 18, 2004, which is a continuation-in-part of U.S. patent application Ser. No. 09/591,258, titled "Method and System for Monitoring and Transmitting Utility Status via a Universal Communications Interface," filed on Jun. 9, 2000. U.S. patent Ser. No. 10/991,789 also claims priority to U.S. Provisional Patent Application Ser. No. 60/520,900, titled "Meter Communication Interface Board with LAN and WAN Capabilities," filed on Nov. 18, 2003. The entire contents of the above-recited priority documents are incorporated herein by reference as if set forth fully herein.

FIELD OF THE INVENTION

The present invention relates generally to automated meter reading. More particularly, the present invention relates to automated meter reading (AMR) devices for collecting data and communicating with one or more remote sites and other AMR devices.

BACKGROUND OF THE INVENTION

Automated meter reading (AMR) devices are often configured to transmit data relating to utility usage parameters to a remote location, such as a utility company. As referenced herein, an AMR device may be a retro-fit device to a utility meter, or may be a solid-state device such as a utility meter itself. More specifically, a retro-fit AMR device attaches to an existing utility meter and includes functionality to read the existing utility meter, transform the meter reading into usable data, and transmit the data to a remote location. Solid-state AMR devices are designed to replace the existing utility meter and are attached directly to the utility line to measure utility usage data and to transmit the data to a remote location.

A significant drawback of prior art AMR devices is that they are functionally limited in their communications options and are thus not generally adaptable to evolving communications technology. AMR devices are typically constructed with hardware and/or software components for transmitting and receiving meter data over a single communications medium. However, as communications technology advances and new and different communications mediums are selected for the transmission of meter data, incompatible AMR devices must be replaced at great expense to the utility companies. Unfortunately, the cost of replacing incompatible AMR devices is often passed on to the consumer.

Another concern of utility companies as they adapt to new communication technologies for monitoring and controlling remote AMR devices is the infrastructure involved in providing a communication means for each AMR device. Where a large network of AMR devices is required, communication costs associated with each can be costly and inefficient. Furthermore, there is no effective and efficient mechanism by which to communicate with and receive data from a large number of remote meters. Therefore, there remains a need in the art for an AMR device that is able to adapt to evolving communications technology by being operable to transmit and receive meter data via any communications medium while simplifying the infrastructure and lowering the cost of providing communication means for monitoring and controlling each AMR device from a remote location.

SUMMARY OF THE INVENTION

Generally stated, the present invention is directed to methods and systems for providing a network of AMR devices, wherein each AMR device on the network may communicate and receive data from a remote utility. According to one embodiment, at least one AMR device is configured as a host AMR device. The host AMR device may communicate with one or more client AMR devices in proximity to the host meter. Briefly, the host and client AMR devices operate as master and slave devices, respectively, in a host-client AMR device system. The host AMR device may transmit command and control functions to the client AMR devices, and may receive AMR device information from each client AMR device. The host AMR device may also transmit AMR device information from both itself and the client AMR devices over a communications network to the utility. Furthermore, the host AMR device may receive command and control functions from the utility via the same communications network, and may relay those functions to other AMR devices associated with that particular host AMR device.

According to one aspect of the invention, a host AMR device may be operable to communicate with a utility and other AMR devices, including client AMR devices, via long and short range communications using at least one interface and a communication module. In particular, the host AMR device's long range communication capabilities may allow the host AMR device to communicate with a utility, while the host AMR device's short range communication capabilities may allow it to communicate with local client AMR devices or other local host AMR devices. Additionally, it will be appreciated that the host AMR device may also communicate via short range with the utility, and via long range with one or more client AMR devices. The host AMR device can act as a relay or repeater between the client AMR devices, other host AMR devices, and the utility. This allows for a more cost effective means of implementing communication functionality AMR devices and a remote utility. Moreover, regardless of the distance over which the host and client AMR devices communicate, the AMR devices of the present invention may utilize one or a variety of communications mediums to transmit and receive meter data to a utility and to client AMR devices. For instance, a host AMR device may communicate with a first client AMR device using a first communications medium, a second client AMR device using a second communications medium, and the utility via a third communication medium. According to another illustrative example, a preferred communications medium, such as a Wi-Fi standard, may be used to communicate with all client AMR devices, while another communications medium may be used by the host AMR device to communicate with the utility.

According to another embodiment of the present invention, a monitoring system (also referred to as the Advanced Metering Portal "AMP") may communicate with AMR devices. The system may include a user interface, such as a graphical user interface (GUI), to allow users and the utility to monitor and communicate with AMR devices over a network. The GUI may be accessible via a network connection, such as the Internet. According to one embodiment, the interface may enable users to communicate directly with host AMR devices, and with client AMR devices via the host AMR devices. When a host AMR device transmits meter data over a network the information is received by a host server of the monitoring system. Once received, the meter data is displayed via the interface to allow a user to monitor communications and meter data sent from a host AMR device. The interface may also accept instructions sent to the host server for further distribution to a host AMR device, and process those instructions to allow communication with the host server which is capable of transmitting the appropriate information to a host server.

That the invention improves over the drawbacks of prior utility communication systems and accomplishes the advantages described above will become apparent from the following detailed description of the embodiments and the appended drawings and claims.

BRIEF DESCRIPTION OF THE DRAWINGS

Figure 1:
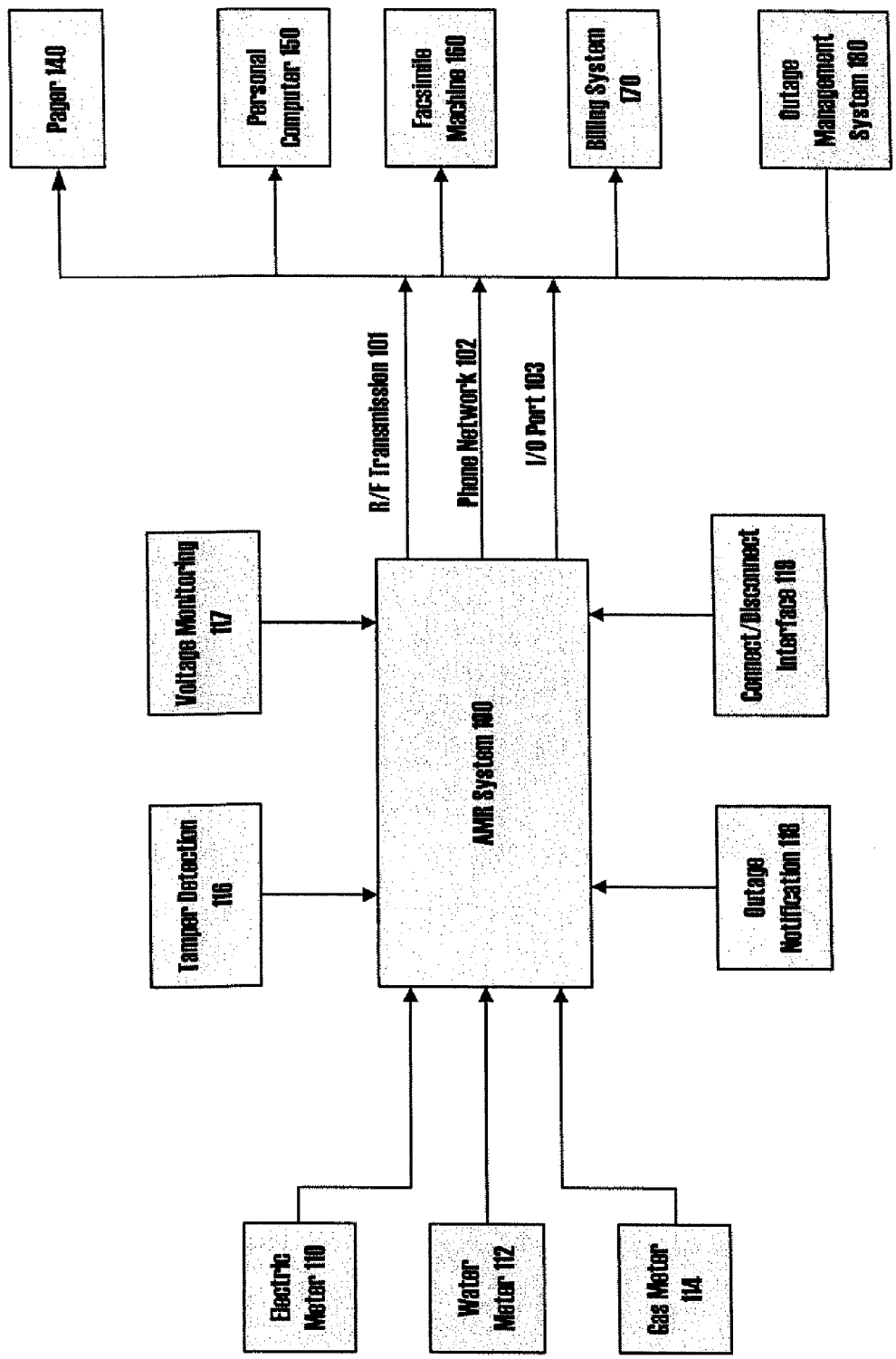

Having thus described the invention in general terms, reference will now be made to the accompanying drawings, which are not necessarily drawn to scale, and wherein;

FIG. 1 is a block diagram showing an AMR system and components that may communicate with the AMR system, in accordance with an exemplary embodiment of the present invention.

Figure 2:
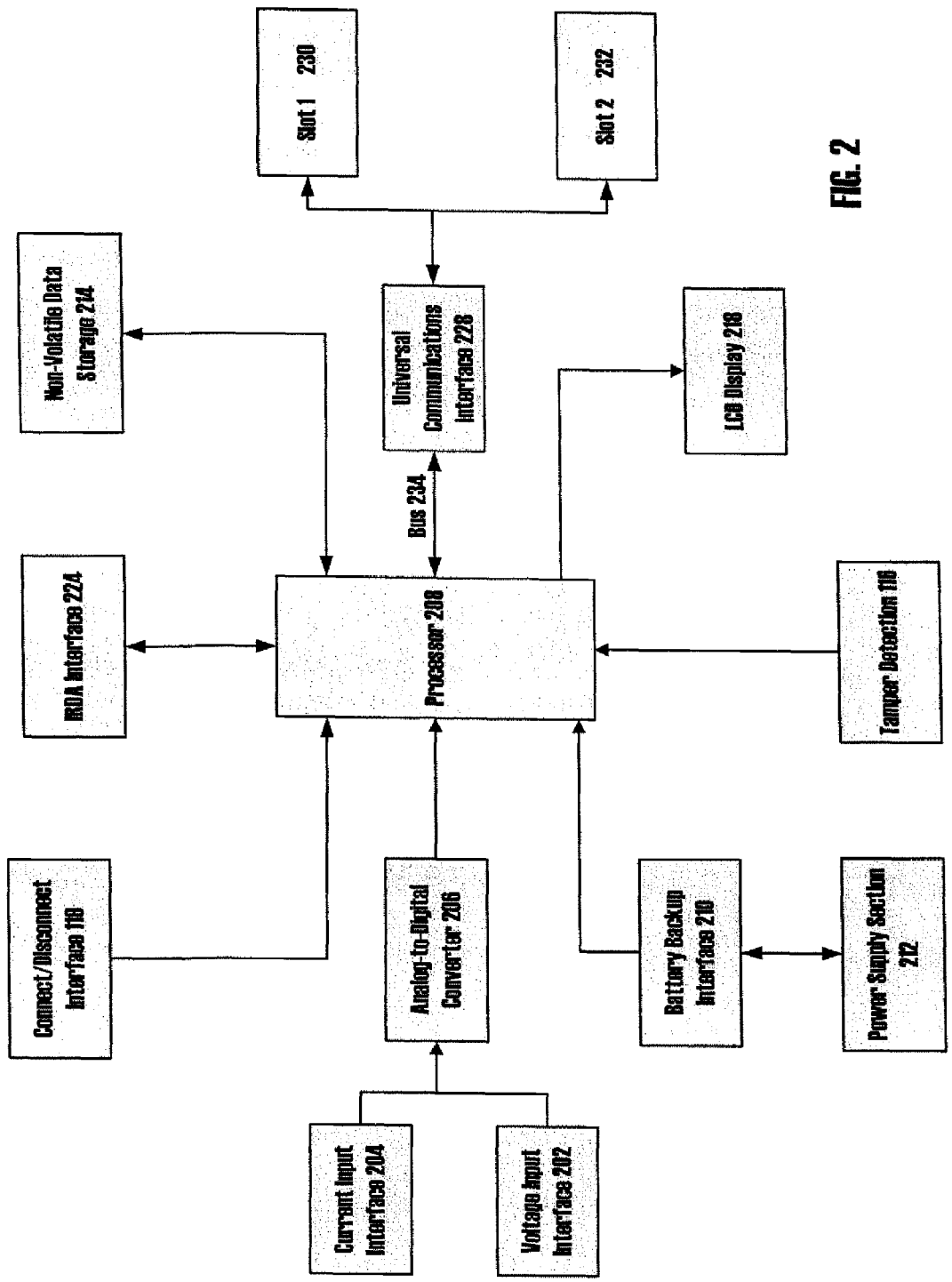

FIG. 2 is a functional block diagram of an exemplary AMR device in accordance with an exemplary embodiment of the present invention.

Figure 3:
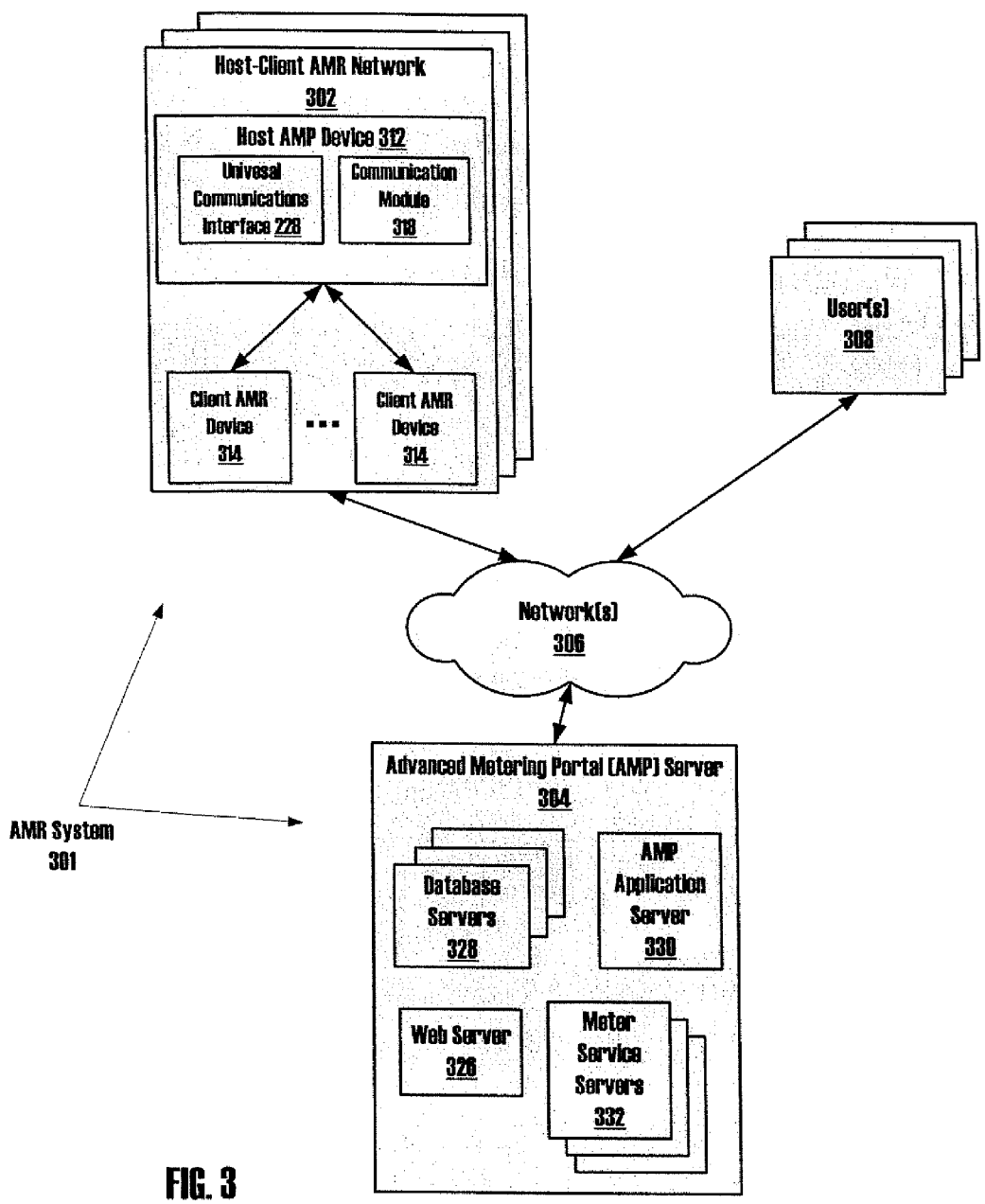

FIG. 3 is a functional block diagram displaying a host-client AMR system, in accordance with an exemplary embodiment of the present invention.

Figure 4:
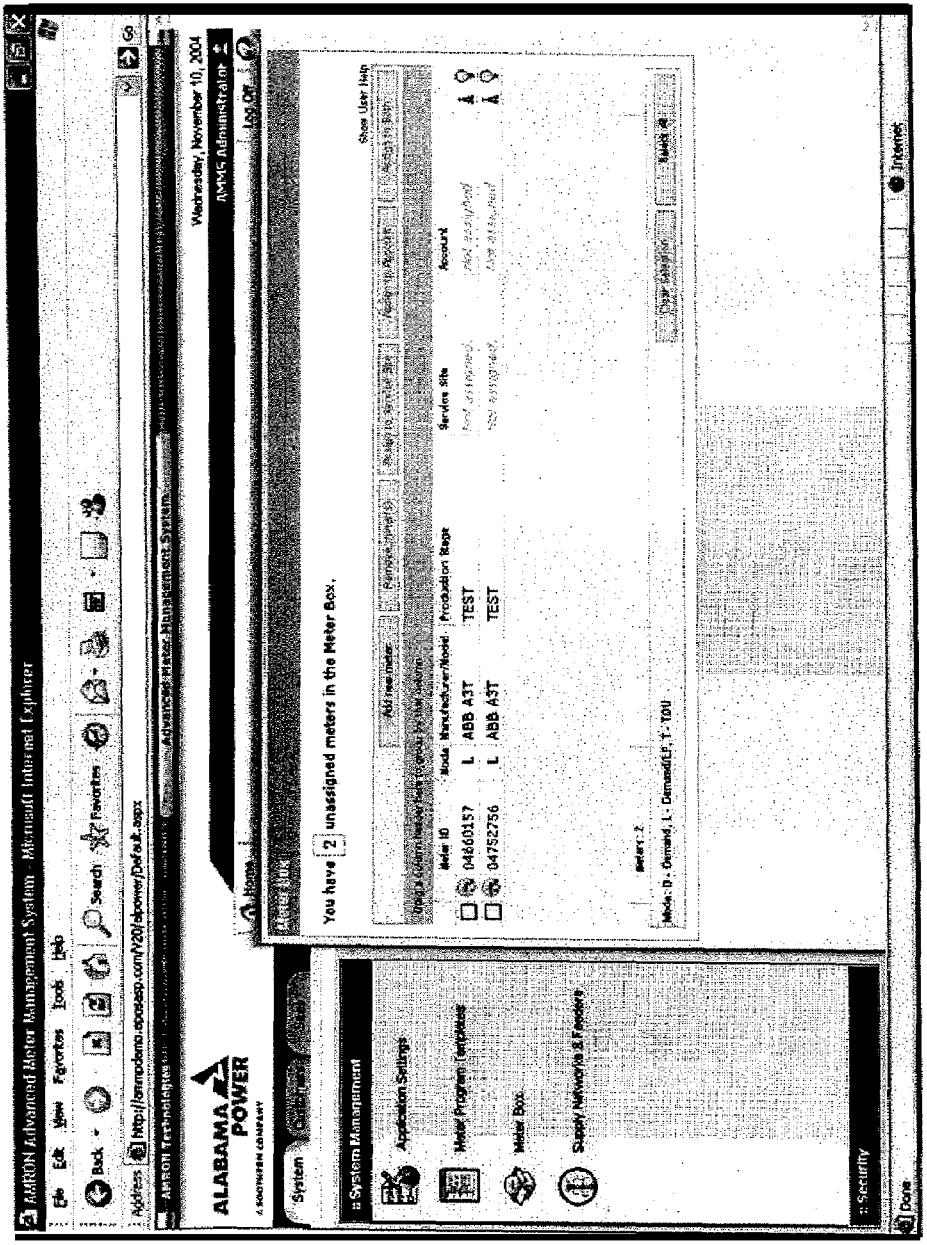

FIG. 4 is an illustrative GUI of an interface for sending and receiving data to and from AMR devices in accordance with an exemplary embodiment of the present invention.

DETAILED DESCRIPTION OF THE PRESENT INVENTION

The present inventions now will be described more fully hereinafter with reference to the accompanying attachments, in which some, but not all embodiments of the invention are described. Indeed, these inventions may be embodied in many different forms and should not be construed as limited to the embodiments set forth herein; rather, these embodiments are provided so that this disclosure will satisfy applicable legal requirements.

FIG. 1 is a block diagram showing an AMR System 100 and components that may communicate with the AMR System 100, in accordance with an illustrative embodiment of the present invention. As referenced herein, an AMR System includes one or more AMR devices (not illustrated). For instance, an AMR System may include a single AMR device operable to receive meter data from multiple sources simultaneously, where the single AMR device is further operable to report the meter data to one or more destinations via one or more communications mediums. As described above, an AMR device may be a retro-fit device to a utility meter, or may be a solid-state device such as a utility meter itself. Therefore, according to another illustrative example, an AMR System may represent multiple AMR devices operable to receive meter data from sources, and/or AMR devices that generate data. In the illustrative and non-limiting example shown in FIG. 1, the AMR System 100 comprises one or more AMR devices that are retro-fit devices that receive meter data from an electric meter 110, a water meter 112, and/or a gas meter 114.

It should be appreciated that FIG. 1 is intended only to show a possible use of the AMR System 100, and accordingly the figure and following text should be regarded as an illustration rather than limitation of use. Additionally, although the exemplary embodiments will be discussed with particular reference to an AMR system 100 adapted for monitoring power, it should be kept in mind that the present invention may also be adapted for other types of utilities, such as water and gas.

The AMR system 100 of the present invention is equipped with a universal communications bus coupled to a universal communications port, which allows the AMR System 100 to operate with interchangeable communications devices. Therefore, the AMR System 100 may accept data inputs from multiple sources and send data through multiple output connections in a variety of data formats. The AMR system 100 is also equipped with "plug and play" technology, so that the AMR system 100 is automatically able to recognize and communicate with a variety of communications devices that may be plugged into its universal communications port. Accordingly, with proper configuration, an appropriate communications device may be plugged into the AMR system 100 to enable the transmission and reception of meter data over any given type of communications medium. Of course, the communications medium selected by the utility company for AMR transmission and reception dictates the type of communications device that must be plugged into the AMR system 100.

The AMR system 100 may accept additional signals from utilities such as a tamper detection monitor 116, a voltage monitor 117, an outage notification monitor 118, or a reconnect/disconnect monitor 119. Alternately, the AMR system may have built-in functionality to monitor these events.

The AMR system 100 shown in FIG. 1 may receive input data (also referred to as meter data) from the monitored meters 110, 112, 114 in a variety of formats. Typically, the input data takes the form of a voltage or current level present in a given meter, although alternate embodiments may accept radio frequency (R/F) data, pressure level, temperature, and so on. When this input signal reaches a certain threshold for a specific period of time, the AMR system 100 transmits a notification signal via a connected output device to a receiving device.

Sample output transmissions include a R/F transmission 101, a DTMF signal sent across a telephone network 102, or a data signal transmitted through a computer I/O port 103, such as a serial, parallel, or USB port. The AMR system 100 may be programmed to transmit on one or more connected devices in one or more signal formats. Exemplary receiving devices include a pager 140, a personal computer 150, a facsimile machine 160, a utility billing system 170, or an outage management system 180. For example, the AMR system 100 may transmit a first signal across the telephone network 102 to a pager 140, notifying a technician of a power outage at the monitored electric meter 110. Simultaneously, the AMR system 100 may send an RF transmission 101 to a billing system 170, notifying the billing system to temporarily suspend billing a customer's account until such time as the electric meter is repaired.

FIG. 2 shows a block diagram of an exemplary AMR device in accordance with the present invention. As shown, the exemplary AMR device includes a voltage input interface 202 and a current input interface 204. Voltage and current are received from a power line (not shown). As should be apparent to those of skill in the art, the input interfaces may be adapted for input from a single phase or three-phase power source. The voltage input interface 202 and current input interface 204 are coupled to an analog-to-digital conversion device 206, such as an RMS converter. Digital signals representing the converted voltage and current are then fed to the processor 208, where the utility usage readings are measured and processed in a conventional manner.

The processor 208 is controlled by firmware stored in the non-volatile data storage 214. Non-volatile storage 214 may include RAM and/or ROM and may be scalable in capacity. RAM may be programmable and re-programmable, so that operational parameters of the AMR system 100 may be changed. The non-volatile storage 214 may be re-programmed remotely through a communications device. Alternatively, non-volatile storage 214 may be re-programmed locally through an IRDA interface 224, or the like. As shown, the AMR device may include additional components, such as: a reconnect/disconnect interface 119 for enabling re-connect and disconnect of utility services; a tamper detection device 116 operable to detect physical tampering with the AMR device; a power supply 212, a battery back-up interface 210, and an LCD display 218. Other components not shown may include an outage notification interface, a voltage monitoring interface and a temperature monitoring interface. Still other components will occur to those of ordinary skill in the art.

The AMR device is equipped with a universal communications interface 228, which allows the system to communicate via any medium, such as: R/F, telephone, cable, fiber optics, satellite, power line carriers, etc. The universal communications interface 228 sends and receives data to and from a communications device (not shown), via ports or slots 230 and 232. Slot 1 230 and slot 2 232 each provide inputs and outputs for coupling with communications devices (not shown). Communications devices may be coupled to the slots 230 and 232 in any well known manner, such as through use of a circuit board or "card", a multi-prong connector (either male or female), a coaxial jack, or other manners apparent to those skilled in the art. Additional slots may be included for coupling additional communications devices to the universal communication interface 228. The universal communications interface 228 also sends and receives data to and from the processor 108 via a universal bus 234.

In a preferred embodiment, the universal bus 234 comprises a 4-bit parallel bus. By using a 4-bit parallel bus, the AMR device may transfer up to four bits of information simultaneously from the universal communications interface 228 to the processor 208, and vice-versa. This permits data from a single source to be rapidly transmitted to and from the processor. Further, the bus 234 may multiplex data transmissions originating from or sent to multiple sources. That is, rather than transmitting a single data bit from a single source interfaced with slot 1 230, then transmitting the next data bit from a second source interfaced with slot 2 232, the bus may simultaneously transmit data to or from up to four devices connected to the universal communications interface 228. For example, a R/F transmitter sending data to a remote location may be connected to slot 1 230, a transmitter operative to notify a pager upon voltage loss may be connected to slot 2 232, another transmitter operative to call a cell phone and play a prerecorded message upon tamper detection may be connected to a third slot, and so on. The universal bus 234 permits the processor 208 to send multiple bits simultaneously to a single device, thus speeding data transmission rates, or to communicate with several devices simultaneously, thus allowing signal multiplexing. In alternate embodiments, the universal bus 234 may be an 8-bit bus, 16-bit bus, or bus of any other size without departing from the spirit and scope of the present invention.

Due to the fact that data generated internal to the AMR device (i.e., the processor 208) will be digital and data generated external to the AMR device may be analog, the universal communications interface 228 may comprise analog-to-digital and digital-to-analog converters. The universal communications interface 228 may also comprise such components as a clock, shift registers, multiplexers, and the like for facilitating the transfer of data between the processor and various types of communications devices. The universal communications interface 228 may include its own processor and non-volatile storage or may be controlled by the processor 108 and utilize the non-volatile storage 214 of the AMR device. Plug-and-play software or firmware may be stored in a non-volatile storage for enabling the universal communications interface 228 to recognize a communications device that is plugged into a slot 230 and 232. As mentioned, a non-volatile storage may be easily re-programmed for updating or adding plug-and-play software or firmware as needed.

Accordingly, an AMR device of the present invention has the ability to send and receive data in ASCII code, DTMF signals, or any other type of signal or data transfer protocol. As an example of the advantages of the universal communications capabilities of the present invention, the AMR device may transfer digital data directly to a digital computer, a fax machine, alphanumeric display cell phone, or a pager of a utility company without the need for a DTMF-to-ASCII converter at the utility company. The AMR system 100 may include additional functionality not herein specifically described. For example, the system may accept to transmit signals in data formats other than those explicitly specified. The AMR system 100 may also have more or less communications slots than enumerated, or may have a universal bus 234 of a size other than four bits. According to another embodiment of the present invention, the AMR system 100 may include one or more host-client AMR networks that enable a single, 'host' AMR device to communicate with one or more 'client' AMR devices, as is next described in detail with reference to FIG. 3. This master-slave relationship between AMR devices enables all communication with a utility to occur via a host AMR device, rather than via every AMR device in an AMR system.

FIG. 3 is a functional block diagram showing a host-client AMR system 301 in accordance with an exemplary embodiment of the present invention. The host-client AMR system 301 generally includes at least one host-client AMR Network 302, one or more users 308, one or more networks 306, and an Advanced Metering Portal (AMP) 304.

Generally, in each host-client AMR Network 302, at least one AMR device is considered a host AMR device 312. The host AMR device 312 is typically installed at a standard metering point in the host-client AMR Network 302, where the standard metering point allows one or more client AMR devices 314 to communicate with the host AMR device 314, either directly or through additional client AMR devices 314. The host AMR device 312 essentially acts as a 'master' device to the 'slave' client AMR devices and relay information to the client AMR devices that typically may make up most of the AMR devices in the host-client AMR Network 302.

In the preferred embodiment, the host AMR device 312 is equipped with a communication module 318. According to one aspect of the invention, the communication module 318 may contain both a long-range communications capability, and a short-range communications capability, where the long range communications capability may be utilized to communicate with a utility or the AMP 304 via the network 306, and where the short-range communications capability may be utilized to communicate with other AMR devices on the host-client AMR Network 302. The long range communication capability may be provided by wired or wireless communication devices including a cellular modem, satellite modem, telephone modem, cable modem, RF modem, fiber optic cable, or other wireless or wired communication systems which would be readily understood by one skilled in the art. The short range communication capability can be provided by wired and/or wireless communication devices such as a Wi-Fi 802.11x card or other wireless or wired communication systems which would be readily understood by one skilled in the art.

In the preferred embodiment, the communication module 318 may include a dual PCMCIA port. This dual port can be used by any PCMCIA-based communications modem (e.g., CDMA, GSM, iDEN, or 802.11x compatible modems, etc.). A WAN card (e.g., CDMA or iDEN) may be plugged into the first port on the PCMCIA card port, to permit the host AMR device 312 to communicate via the network 306 to transmit real-time AMR device information. This arrangement offers utilities a choice in which type of communications to use in transmitting meter data. For example, after operating using CDMA for a period of time, it may be found that it is less expensive or that better coverage is available from the use of iDEN.

The PCMCIA standard allows the communications module 318 to include any off-the-shelf communications module with a PC Card interface. Communications modules may include:

CDMA/1xRTT Cellular Modem (Code Division Multiple Access/Single Carrier (1x) Radio Transmission Technology)
TDMA Cellular Modem (Time Division Multiple Access)
GSM/GPRS Cellular Modem (Global System Mobile/General Packet Radio Service)
iDEN Cellular Modem (Integrated Digital Enhanced Network)
CDPD Cellular Modem
Satellite Modem
Network Interface Card
Wireless Network Interface Card
Telephone Modem
RF Modem
Serial Communications Cards (RS232, RS485)

In an environment where there are multiple AMR devices in a relatively close proximity (300 feet for wireless, up to 4,000 feet with a hardwired connection), a second communications card can be plugged into the second PCMCIA port of the host AMR device's 312 communication module 318. In the preferred embodiment, the second PCMCIA card is a LAN card of some type (802.11x, Bluetooth, etc.). This enables the host AMR device to become the "master" AMR device and responsible for communications with any other "slave" AMR device (referred to as client AMR devices 314), which are relatively close in proximity to the host AMR device 312 and are connected via the same LAN connection. In a preferred embodiment, the communication module 318 hardware utilizes Bluetooth communications for communicating between host AMR devices 312 and multiple client AMR devices 314. Client AMR devices 314 may also have communications modules 318 to communicate with the host AMR device 312. Bluetooth communication protocols allow for each end device to be programmed as "discoverable" or "non-discoverable." If programmed to be discoverable, then the device can be "seen" by any other Bluetooth unit programmed the same way. On the other hand, if the unit is programmed to be non-discoverable, then it will only communicate with a specific and addressable Bluetooth unit. This discoverable/non discoverable feature may allow for network node customization and provide added security features to the system in that each device may be told which other devices (host or client) with which it can communicate.

In a preferred embodiment, client AMR devices 314, located in the vicinity of the host AMR device 312 are equipped with the same short range communications capabilities (e.g., Wi-Fi 802.11x) and communicate all meter data to the host AMR device 312. In the preferred embodiment, all the client AMR devices 314 connected via the same LAN network would have the communication module 318 installed with the only the LAN card plugged into a port. In this configuration, the client AMR device 314 communicates only with the host AMR device 312, though one skill in the art will appreciate various configurations where client AMR devices could communicate with each other or even multiple host AMR devices. In addition one of ordinary skill in the art will appreciate that host AMR devices could be client AMR devices to other host AMR devices, or host AMIR devices could communicate with other host AMR devices (as sort of repeaters of AMR device information). In any of the aforementioned configurations, the communication between a host AMR device 312 and its corresponding client AMR devices 314 creates a host-client AMR system 302.

There are several advantages to this type of host-client architecture. One is that the utility only has to purchase one WAN card (typically the more expensive hardware component) and allow a utility to pay only one continuing monthly fee for communications. The cost per meter is much lower considering the avoided hardware and continuing monthly costs. Additional capabilities being integrated include external controls. Using the same LAN capabilities described above, any number of external equipment can be turned on or off throughout the coverage area. This equipment may include backup generators, boilers, chillers, capacitor banks, HVAC equipment, load control devices, security, lighting, etc. Using the host AMR device's 312 Bluetooth LAN communication capabilities, a utility can now control or monitor nearly any external device or other read any other AMR device. Therefore the metering technology is only the basis for continued scalability and growth of a totally advanced and automated system. Further, the metering system requires no mounting of equipment on poles or towers. The metering hardware provides for totally under glass solution so that there are no external boxes to install or wiring to connect. Thus, very few, if any, site visits would likely be required for maintenance of the metering system.

In an alternative embodiment, the ability to interface and interrogate other client AMR devices 314 (or even other host AMR devices 312) can also be accomplished through the use of RS-485 connectivity. The communications module 318 can incorporate this technology for those locations where interference or distance between AMR devices and/or control equipment is too significant to be handled by other LAN connections such as 802.11x wireless capabilities.

Referring once again to FIG. 2, in the preferred embodiment, the communications module 318 of host AMR devices 312 may use the long-range communications capability of their communications modules 318 to both transmit and receive metering data and command and control functions to and from the AMP server 304 over a network 306 for all the client AMR devices 314 communicable with the host AMR device 312. The host AMR device 312 also uses its universal communications interface 228 to send meter data including data related to meter operations, power consumption, location, etc. to the meter's communication module 318, which then sends out the meter data to the AMP server 304 over the network 306. Those of ordinary skill in the art will appreciate the various ways the meter data or command and control functions can be transmitted to the utility. For example, the data can be sent in batch form, at the specific request of a network user 308, or automatically set up for a particular time, etc.

The network 306 can be either a public or private communications network. In the preferred embodiment the WAN for the metering system can be virtually any public RF network such as the Internet. Once a host or client meter is installed, LED indicators on the meter indicate when the meter has registered on the network 306. In the preferred embodiment, the hardware used metering systems uses specific coding and address identification for communications. In other words, the communications module 318 installed inside a meter is programmed to communicate with only the AMP servers 304 in the network 306. In order for it to communicate with any other device, the host IP and an array of security codes would have to be known. The same is true when referring to the LAN communications of the metering system. Each communications module 318 may be assigned and accessed via a specific Internet Protocol Address (IP Address). In a preferred embodiment, the host-client AMR system 301 may utilize a flexible communications technology that allows for the use of nearly any public communications carrier. This capability allows for use of multiple carriers, thus reducing any risk of one carrier going "dark." It also better allows a utility to place host AMR devices 312 (those that may act as a repeater/concentrator) in nearly any location the utility chooses.

Using any ISP (Internet Service Provider), the meter can be outfitted with a low profile modem or other WAN communication means appreciated by those skilled in the art. The data is communicated over the ISP's network to the AMP server 304. In an alternative embodiment, the meter data can also be imported. Once the data is collected it can then be displayed over the Internet using the AMP interface discussed in further detail below with reference to FIG. 5.

It will be appreciated that the AMP interface is described below with reference to a GUI and the block diagrams shown in FIG. 3. It should be understood that blocks of the block diagrams and GUIs, respectively, may be implemented by computer program instructions. These computer program instructions may be loaded onto a general purpose computer, special purpose computer, or other programmable data processing apparatus to produce a mechanism, such that the instructions which execute on the computer or other programmable data processing apparatus create means for implementing the functions specified herein.

These computer program instructions may also be stored in a computer-readable memory that can direct a computer or other programmable data processing apparatus to function in a particular manner, such that the instructions stored in the computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

The Advanced Metering Portal (AMP) 304 is a software system used to monitor all communications and data movement between energy meters and host servers. The AMP software is for meter data collection, management, and dispersal. The metering system does not currently incorporate the reading of any type of meter other than electric however, those skilled in the art will appreciate that the AMP web based software system will certainly read other metering systems. In the preferred embodiment, the system is designed to work with any ANSI C12.19-1997 compliant electric meter (with the ability to be extended to support ANSI C12.19-1997 compliant gas and water meters). The communications interface supported by the AMP also complies with ANSI C12.18-1996 (PSEM). Protocol Specification for Electrical Metering (PSEM) is an open industry protocol standard used for communicating with electronic metering devices.

As the AMP portal collects data sent to it by various host AMR devices 314, the AMP software outputs the information to a web based interface, thus providing one software interface to read various AMR devices. FIG. 4 is an illustrative GUI of an interface for sending and receiving data to and from AMR devices in accordance with an exemplary embodiment of the present invention. As shown in FIG. 4, the web-based interface allows a user 308 to access meter data and remotely program the AMR devices over a public network such as the Internet by any PC device and can monitor data from multiple meters installed anywhere in the world. As appreciated by those skilled in the art, a PC device could include any device having Internet capabilities such as a laptop, mobile phone, PDA, handheld PC, etc. allowing additionally mobility and flexibility in meter monitoring and interrogation. Also shown in FIG. 4 is the layout of the interface showing the preferred use of tabs, icons and data windows which helps simplify the use of the interface for reading meter data and remotely programming the AMR devices. One of ordinary skill in the art will appreciate various arrangements and layouts of the web-based interface to provide a user-friendly experience when a user 308 is utilizing the interface.

In the preferred embodiment, the AMP's typical configuration incorporates three controllers—one Web Server 326, one AMP Applications server 330 (also known as the Business Logic Server) and one database server 328. As one of ordinary skill in the art can appreciate additional servers (e.g., meter service servers 332, additional database servers 328, etc.) may be also be incorporated into the AMP system.

In the preferred embodiment, the AMP incorporates the C+Coding Standard and the SQL Database Design Standard. The AMP software is designed to operate under the Microsoft Windows 2000 Server operating system and is written using Microsoft Visual Studio.NET tools. The AMP software interfaces can be implemented in both HHF and ISO (utility specific). In addition, the AMP software system can provide data to nearly any internal utility system by FTP (or Secure FTP), frame relay or other connection required. Those of ordinary skill in the art will appreciate other coding methods to run the AMP software and other operating systems that can also host the system. The AMP software includes many built-in diagnostic features, in addition to any provided by the operating system administration tools ass will be discussed in relation to the other various capabilities of the AMP software system.

In the preferred embodiment, the AMP Servers are physically housed in a secure facility, featuring redundant power and telephony connections, as well as, long term emergency back up power generation capability. The AMP Servers are monitored 24/7 and are protected by a number of security measures, including both hardware and software firewalls, intrusion detection and a dedicated emergency response team. In an exemplary embodiment, the software system is backed by the SQL server database, however, one skilled in the can appreciate various means to backing up system data. In one embodiment, the AMP Servers are backed up on a daily basis and offsite restoration images are maintained, this includes the AMP database.

In a preferred embodiment, using the prior backup plus the transaction log, the system could be restored to the last checkpoint if needed. The AMP web enabled portal offers data replication through its back up and recovery processes of all production systems, which include the database server, IVR servers, firewall, and the domain controllers. DMZ systems, which are the FTP Servers and Web Servers, are backed up once a week using NT Backup. The file is moved to the server and then written to tape. The advantages of the hosted solution in terms of system management, implementation, reliability, security, and accessibility are significant. The host can provide full custom integration services to capture meter data and interface it to any billing or customer systems within the utility. These custom interfaces can create a completely automated billing and information system.

Also in the preferred embodiment, each meter communicating within the AMP system operates with autonomy with each containing local storage that preventing the loss of local meter data in response to any network issues. In an exemplary embodiment, within each meter there is a programmable No-Communication-Timeout parameter which is used to cause a given meter to execute a complete hardware reset if no AMP communication is received within the stated period of time. For example, if a given meter is placed on a once daily (24 hour) read schedule and no communication occurs within 26 hours, then the meter can be made to execute complete power up reset. This reboot will reinitialize the entire meter communication interface, including any installed modem.

As shown in FIG. 4, the AMP web based interface can be highly customized to meet a utility's or user's 308 needs and perform a variety of functions. The AMP web enable software interface allows a user to enable/disable meter communications, set register reading, power quality reading, and load profile reading intervals per meter, view communication logs, view a meter's status including the last date and time the meter was successfully read and how many days/hours/minutes since the last successful read, and perform various other tasks appreciable by those of ordinary skill in the art via the AMP interface.

The AMP software is capable of real-time readings of all energy data (e.g., consumption, time of use, etc.), power quality readings (e.g., RMS phase voltages, PMS currents, frequency, line to line voltage, etc.) and load profiles. The AMP software system also allows for meter reads for billing purposes. Both scheduled reads and on-demand reads and other methods of monitoring meters appreciable by one skilled in the art can be supported by the AMP software system. The AMP system can allow a user 308 program the meters over the network 306 (e.g. updating communication drivers, retrieve or upload both data and executable files, other firmware updates, etc.) and also has the capability of providing eternal controls such as turning on or off backup generators, capacitor controls or resetting modems.

Another feature is the ability to upload new firmware and/or configuration setting over the air. The ability to update the executable code on the communication module 318 is a unique feature of the AMP system. The ability to update allows for the addressing of firmware related issues or the adding of features without having to physically access the meter hardware. The update capability also, allow for a rolling back of any given update, should some issue emerge. In the preferred embodiment, Firmware or configuration updates are accomplished in batch mode, meaning that a new firmware version can be rolled out en mass without having any human intervention. As these new products are created and used by the system, any driver, firmware or other software updates that need to be made to the meters in the field, can be done via the AMP web based software tools, requiring no field visits. The updating may include changes to the communication module configuration or to the actual executed firmware. In addition to the updating process done through batch updating, one of ordinary skill in the art will appreciate various ways of updating the remote meters' communication modules 318.

In addition, meter set-up and access is performed via the AMP software. The AMP software can allow a user 308 to build groups of meters for viewing their historical or present readings and conduct real time pricing (including pricing projections). Meters are registered on the AMP using an "Add Meter Wizard" guide feature. This wizard guide the operator through the process of adding a meter to the portal. The basic information required to enter a meter on the portal is the meter ID and the IP address of the installed modem, in the case of a Host Meter, or of the associated Host Meter, in the case of a Client Meter. Upon completion of adding the meter to the portal the user can immediately read the meter and verify proper operation.

Further, the AMP software can provide a user 308 event notices and alarms with regards to power outages or restorations, monitoring of meter readings (e.g., power factor, maximum voltage levels, battery levels, etc.). In an exemplary embodiment, the metering hardware monitors the voltage on phase A of the meter. If this voltage falls below 10% of the nominal input voltage, then a power event alarm is generated. The meter hardware does not create the time stamp. Instead the AMP software system creates the time stamp with receipt of the event and then issues it to the required logs/reports.

As an alerting feature, the AMP can be configured to issue an email alert for any meter for which communication is lost. From a system standpoint, failure of a single meter has no overall detrimental affect to the AMP operation, with the exception of the temporary unavailability of the failed meter and, in the case of a Host Meter, any Client Meters that may reside on the failed Host Meter's Pico net. Upon restoration of communication with a failed meter, the AMP will retrieve all stored meter data to ensure the continuity of the meter data, including load profile data. The restoration of data includes any affected Client Meters.

In a preferred embodiment, the AMP software has the capability of generating reports for users (e.g., reports/graphs, user defined reports, flexible components and sorting, power quality including vector diagrams, downloadable data into multiple formats text and graphical (EXCEL, WORD, etc), print capabilities, etc.) The AMP can also be configured so that custom software interfaces can be created that allow for the collected data to be transported directly to and from a utility's billing system. A consumer version of the software interface could include as many of the features available for a utility user as the utility would want (e.g., meter history, meter aggregation, real time pricing notification selection, user settable reports, external controls, etc.) In both the customer and utility version of the AMP web based interface, access to the AMP software is provided via secure login passages. All facets of system operation and updates are completed automatically without burdening the utility. In the preferred embodiment, consumer users have no direct accessibility to the AMP database. In the preferred embodiment, various levels of security are implemented on the AMP software system. In a preferred embodiment, there are four levels of security (e.g. viewing only, read on demand and viewing, full meter access with no external controls, and no meter access, full external controls), but those of ordinary skill in the art can appreciate other methods for ensuring network security.

In an exemplary embodiment of the AMP software system, the software system has a order of priority for how multiple requests over the software system are handled. Events and alarms are processed and handled as priority. Billing reads and manual meter reading requests are treated as a second priority. Lastly, are the scheduled meter readings. One of ordinary skill in the art can appreciate various ways to implement various priority schedules.

There are no limitations on the number of points that can be monitored and controlled, the meters that can be read, or the amount of data collected using the AMP software. In the preferred embodiment, the system is setup to read 200 meters simultaneously but can perform a complete meter read (all register reads, load profile update, power quality, etc.) in approximately ten (10) seconds. This equates to approximately 70,000 meters per hour though that may be increased. It is simple task to change the systems settings currently being used so that any number of meters can be read.

Many other modifications and additional features will also become evident in view of the preceding description of exemplary embodiments of the invention. It should be appreciated that many features and aspects of the present invention are described above by way of example only and are therefore not intended to be interpreted as required or essential elements of the invention, unless so stated. Accordingly, the foregoing relates only to certain embodiments of the invention and numerous changes may be made therein without departing from the spirit and scope of the invention as defined by the following claims.

That which is claimed:

1. A method of processing data associated with a plurality of meters, the method comprising:
   at a first device, receiving status information from a plurality of meters;
   at the first device, identifying a communication device of a plurality of different types of communication devices operative to communicate via a respective one of a plurality of different communication media, wherein the communication device is connected to a communication module configurable for communicating with each of the plurality of different types of communication devices;
   at the first device, formatting the received status information into a format compatible with the identified communication device;
   at the first device, sending the formatted status information to the identified communication device for transmission by the identified communication device to a second device;
   at the second device, receiving the sent status information from the identified communication device;
   at the second device, monitoring the status information received from the identified communication device;
   at the second device, identifying occurrence of an event based on monitoring the status information; and
   from the second device, communicating an alert upon identification of the occurrence of an event.

2. The method of claim 1, wherein the event is selected from the group consisting of a meter communication failure condition, a power outage condition, a power restoration condition, a depleted battery condition, and a low input voltage condition.

3. The method of claim 1, further comprising:
   at the first device, receiving registration data from the plurality of meters;
   at the first device, formatting the received registration data into the format compatible with the identified communication device;
   at the first device, sending the formatted registration data to the identified communication device for transmission by the identified communication device to the second device;
   at the second device, receiving the sent registration data from the first device; and
   registering the plurality of meters at the second device.

4. The method of claim 1, wherein communicating the alert comprises outputting the received status information to a graphical user interface for display to a user.

5. The method of claim 4, wherein the graphical user interface is displayed in a web interface.

6. The method of claim 1, wherein communicating the alert comprises sending an email communication including the received status information to a user.

7. The method of claim 1, further comprising generating a report based on the received status information.

8. The method of claim 7, further comprising providing the generated report to a user.

9. The method of claim 8, further comprising determining a level of security associated with the user before providing the generated report to the user, wherein the level of security indicates the user's privileges associated with accessing the generated report.

10. The method of claim 9, wherein the user is a customer associated with a meter of the plurality of meters.

11. The method of claim 1, wherein the received status information includes a meter reading from a meter of the plurality of meters.

12. The method of claim 1, wherein the status information is received simultaneously from the plurality of meters.

13. The method of claim 1, further comprising at the first device, identifying a second communication device of the plurality of different types of communication devices;
   at the first device, formatting command data into a format compatible with the identified second communication device; and
   at the first device, sending the formatted command data to the identified second communication device for transmission by the identified second communication device to the plurality of meters.

14. The method of claim 13, further comprising receiving the command data from the second device at the first device before formatting the command data.

15. The method of claim 13, wherein the identified second communication device supports a short range communication medium.

16. The method of claim 15, wherein the identified communication device supports a long range communication medium.

17. The method of claim 13, further comprising at a meter of the plurality of meters, receiving the formatted command data from the identified second communication device; and
   at the meter, executing a command associated with the received formatted command data.

18. A system comprising:
   a first device comprising a universal communication interface functionally coupled to a processor and configurable for communicating with a plurality of different types of communication devices, wherein the universal communication interface is configured to receive status information from a plurality of meters and the processor is configured to identify a communication device of the plurality of different types of communication devices;
format the received status information into a format compatible with the identified communication device;
wherein the universal communication interface is configured to send the formatted status information to the identified communication device for transmission by the identified communication device to a second device; and
a second device comprising a communication interface functionally coupled to a second processor, wherein the communication interface is configured to receive the sent status information from the identified communication device and the second processor is configured to monitor the status information received from the identified communication device;
identify occurrence of an event based on monitoring the status information; and
communicate an alert upon identification of the occurrence of an event.

19. The system of claim 18, wherein communicating the alert comprises outputting the received status information to a graphical user interface for display to a user.

20. The system of claim 18, wherein communicating the alert comprises sending an email communication including the received status information to a user.

21. The system of claim 18, further comprising generating a report based on the received status information.

22. The system of claim 21, further comprising providing the generated report to a user.

23. The system of claim 22, further comprising determining a level of security associated with the user before providing the generated report to the user, wherein the level of security indicates the user's privileges associated with accessing the generated report.

24. The system of claim 23, wherein the user is a customer associated with a meter of the plurality of meters.

\* \* \* \* \*